United States Patent [19]
Reber

[11] 4,038,155
[45] July 26, 1977

[54] ENERGY SAVING VAPOR DEGREASING APPARATUS

[75] Inventor: Russell H. Reber, Orange, Calif.

[73] Assignee: Purex Corporation Ltd., Lakewood, Calif.

[21] Appl. No.: 673,606

[22] Filed: Apr. 5, 1976

[51] Int. Cl.² .............................................. B01D 3/00
[52] U.S. Cl. ................... 202/170; 202/160;
202/204; 202/206; 203/1; 203/DIG. 16;
203/39; 134/57 R; 134/57 DL; 134/58 DL;
134/200; 432/57
[58] Field of Search .................... 202/170, 83, 170 D,
202/204, 160, 206, 181, 202; 203/1, 39, DIG.
16; 134/57 R, 105, 108, 57 DL, 109, 58 DL,
200; 34/73; 432/57

[56] References Cited
U.S. PATENT DOCUMENTS

| | | | |
|---|---|---|---|
| 2,083,012 | 6/1937 | Eastwood | 202/170 |
| 2,217,705 | 10/1940 | Ratuiczak et al. | 134/57 DL |
| 2,527,349 | 10/1950 | Black | 202/206 |
| 2,771,086 | 11/1956 | Kearney | 202/170 |
| 2,782,793 | 2/1957 | Bradley et al. | 134/58 DL |
| 2,867,225 | 1/1959 | Zademach et al. | 202/170 |
| 3,028,870 | 4/1962 | Fay | 134/58 DL |
| 3,111,952 | 11/1963 | Roehl | 202/170 D |
| 3,329,581 | 7/1967 | Wadman | 202/170 |
| 3,483,092 | 12/1969 | Young | 202/160 |
| 3,891,510 | 6/1975 | Drostholm et al. | 202/160 |

*Primary Examiner*—Wilbur L. Bascomb, Jr.
*Attorney, Agent, or Firm*—William W. Haefliger

[57] ABSTRACT

The environment of the invention comprises work degreasing apparatus wherein a tank contains liquid solvent to be vaporized by a heater for degreasing contact with work introduced into the tank, the vapor being subject to condensation, there also being a tank cover having open and closed positions. The inventive improvement comprises means responsive to closing of the cover to control the heater to reduce heat transfer to the liquid solvent, and also responsive to opening of the cover to control the heater to increase heat transfer to the liquid solvent.

15 Claims, 8 Drawing Figures

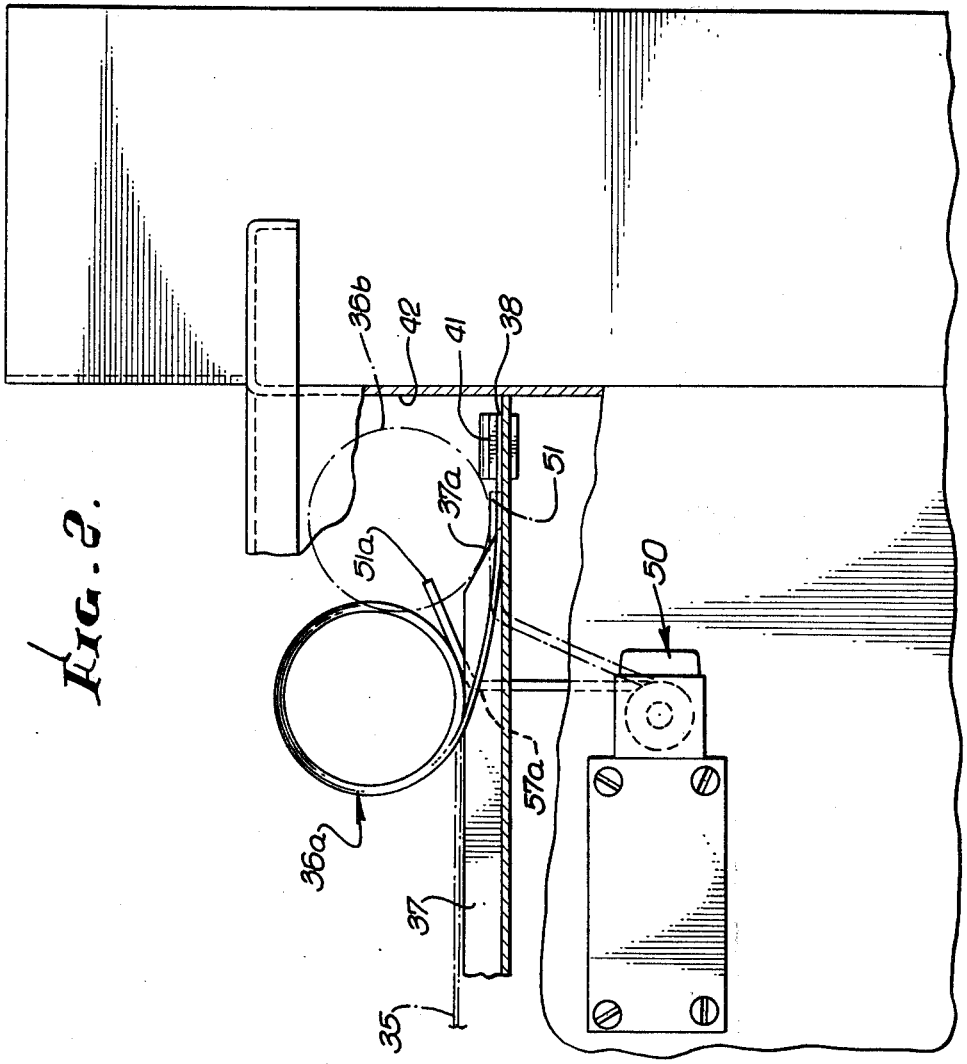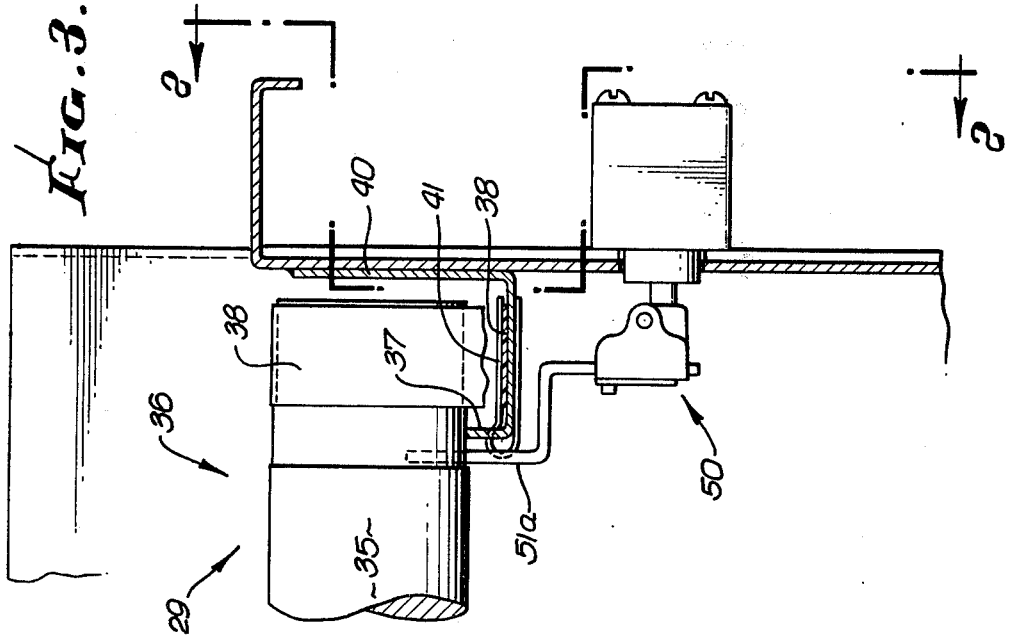

ENERGY SAVING VAPOR DEGREASING APPARATUS

BACKGROUND OF THE INVENTION

This invention relates generally to the control of degreasing apparatus; more specifically, it concerns the control of solvent vaporization in such apparatus in such manner as to effect substantial energy savings.

In solvent vapor degreasers, heat is introduced into liquid solvent to produce the vapor in a tank, the vapor condensing on the parts to be cleaned, and draining to a sump along with the soil. Solvent vapor which does not condense on the parts is liquified and either sprayed on the parts or directly returned to the sump, or both.

Parts are typically introduced to the tank from the top, with the tank cover open, and the cover is closed when the tank is not in use. In the past, it was thought necessary to heat the liquid solvent at the same rate, whether or not parts were being cleaned, to maintain the solvent sufficiently vaporized and recirculating, as described, so that parts or work could be degreased quickly and efficiently. Such constant heating, however, is wasteful of energy, but no way was known to substantially reduce energy consumption while maintaining the apparatus in vapor-filled condition for ready use, in the unusually advantageous manner as is now afforded by the present invention.

SUMMARY OF THE INVENTION

It is a major object of the invention to provide vapor degreasing apparatus capable of substantial savings in energy and cost of same, while maintaining satisfactory valve levels for degreasing and while remaining capable of utilization of normally full solvent content, for optimum cleaning capability. In accordance with the invention, energy saving means is provided which reduces the heat input during idle periods of the apparatus, and it restores the heat input to full capacity as soon as the degreaser lid or cover is opened, in anticipation of introduction of a work load. This is to be differentiated from prior heat "boosters" which comprised heaters actuated by thermostats operated to increase heat input in case the vapor collapsed after introduction of the work.

Basically, the invention contemplates the provision of first means responsive to closing of the cover to control the heater to decrease heat transfer to the liquid solvent and also responsive to opening of the cover to control the heater to increase heat transfer to the liquid solvent. As will be seen, such first means may comprise a switch operated by the cover which may be in the form of a flexible sheet unwrapped by a traveling roller, the latter actuating the switch as the roller arrives at or is moved from closed position.

Another aspect of the invention concerns the provision of second means responsive to the level of liquid solvent in a condensed solvent holding zone, for controlling the heater to increase heat transfer to the liquid solvent in its collection zone in response to a lowering of that level, and to decrease heat transfer to the collection zone solvent when the level in the holding zone rises to or above a predetermined level. In this regard, solvent in the holding zone is typically removed as by a pump for spraying onto work in the tank. As a result, the second means, which may comprise a level sensor controlling an electrical switch, assures that sufficient condensed solvent will be in the holding zone for spraying, irregardless of the state of the energy control switch. Finally, the heater is subject to manual override control, as will be explained.

These and other objects and advantages of the invention, as well as the details of an illustrative embodiment, will be more fully understood from the following description and drawings, in which:

DRAWING DESCRIPTION

FIG. 2 is an enlarged side elevation showing cover actuation of a switch;

FIG. 3 is an enlarged frontal elevation, in section, showing the switch and associated equipment of FIG. 2;

DETAILED DESCRIPTION

Figure 1:
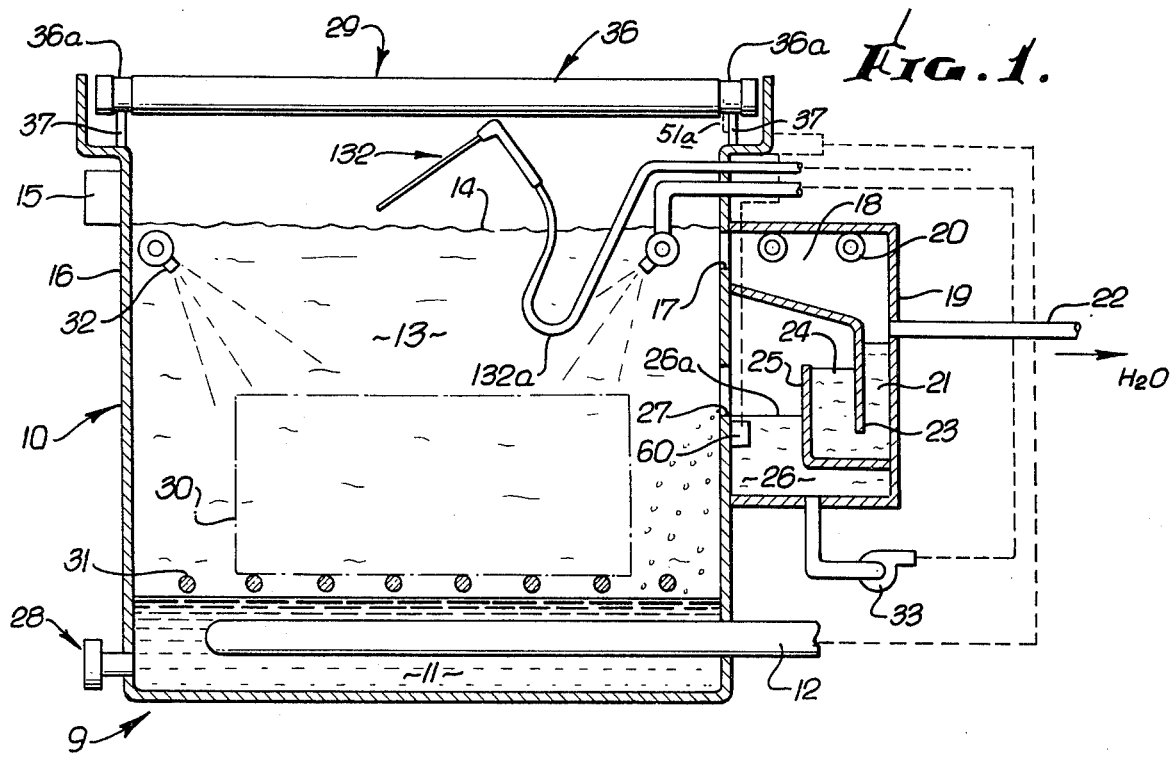
FIG. 1 is an elevation taken in section through degreaser apparatus.
Figure 5:
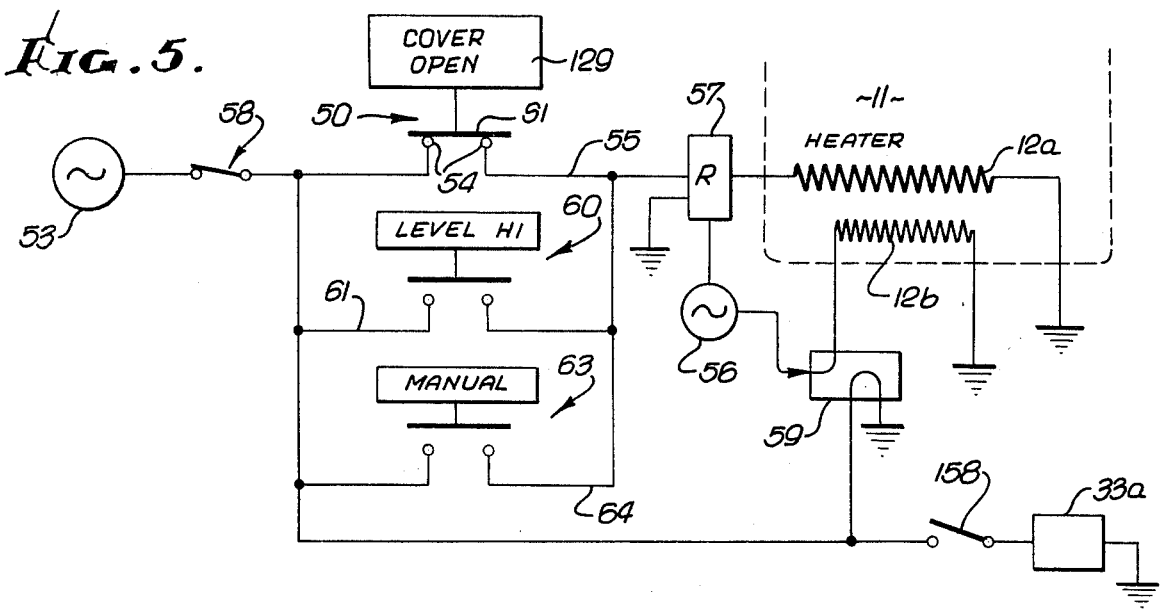
FIGS. 5–7 are electrical diagrams.
Figure 6:
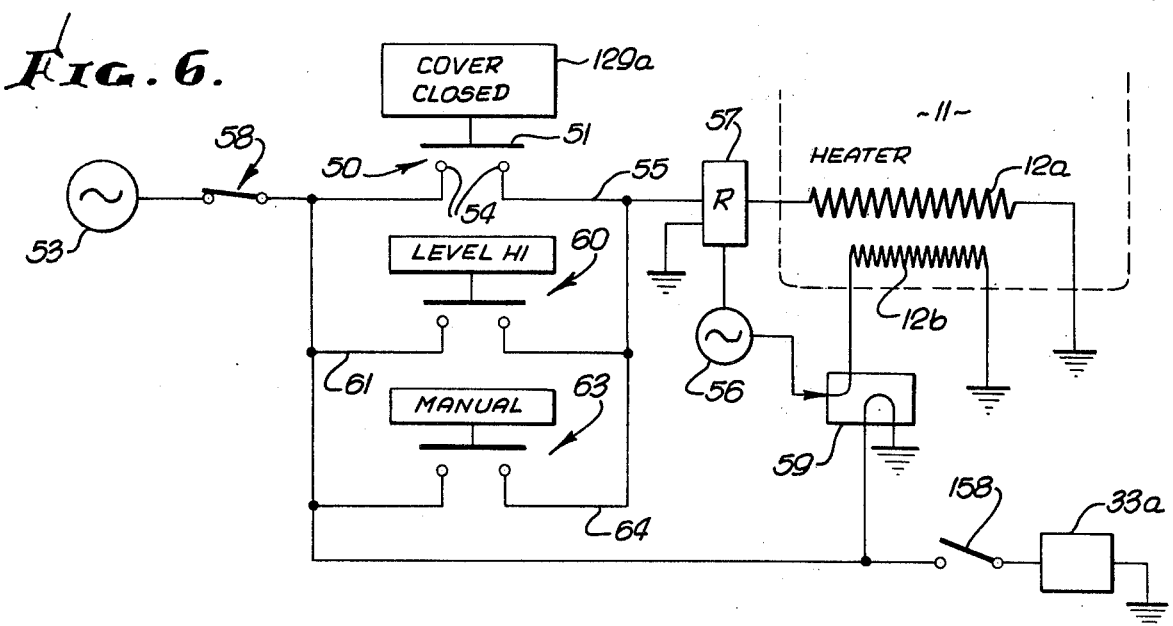
Figure 7:
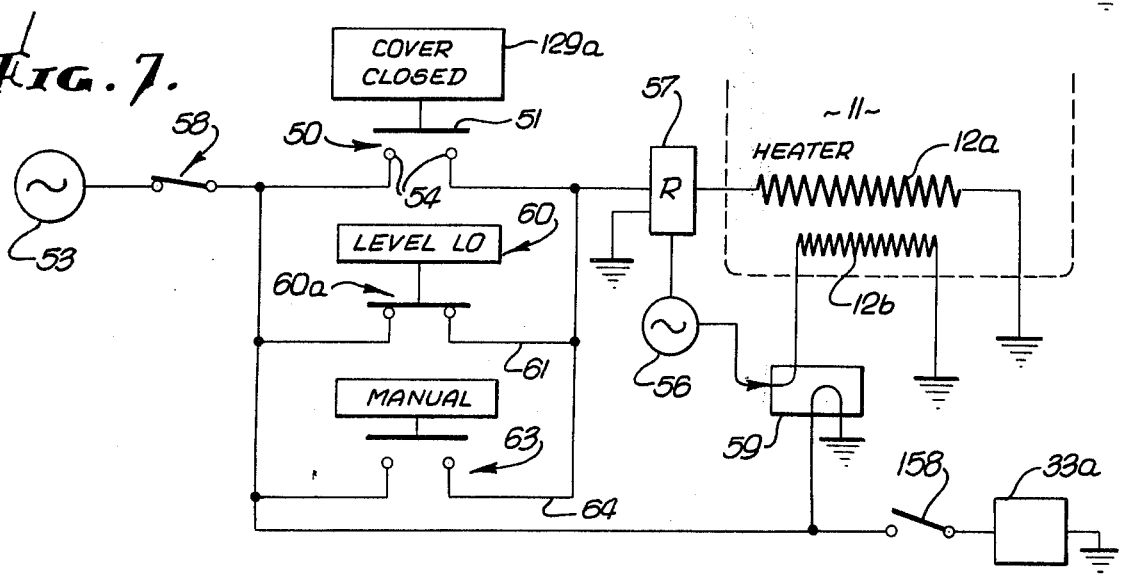

In FIG. 1, the vapor degreasing apparatus 9 includes a tank 10 which contains liquid solvent 11 in a lower sump zone. The liquid solvent receives heat transferred from heater 12 for vaporizing the solvent, the vapor filling the degreasing zone 13 to level 14. The latter corresponds to the level of a water jacket 15 cooling the vapor as via the metallic tank wall 16; also, vapor flows laterally through a tank wall opening 17 and to a condensing zone 18. The latter is enclosed as by a receptacle 19, and contains condenser coils 20 acting to condense the vapor, which collects at tank or zone 21. Any water condensed with the solvent is drawn off via side outlet 22, and pure solvent flows beneath weir 23 and through trap 24. From the latter, solvent overflows weir 25 into supply zone or tank 26 in the receptacle 19. From the latter, solvent returns to collection zone or sump 11, as by spillage over weir 27. A tank drain appears at 28, and a tank cover at 29. Parts introduced downwardly into the tank when the tank is open are represented at 30, to be supported as by rack 31. Solvent spray may be directed at the parts, as via jets 32 to which solvent is supplied as from a pump 33. Alternatively, a hand-held spray lance 132 may be employed to direct solvent spray onto the parts. Such a spray may include a flexible line 132a to which pump 33 may be connected. The pump takes suction from the zone 26, as shown, and is operated whenever a switch 158 is closed to supply current to pump motor 33a as seen in FIGS. 5–7. This type equipment is produced by Baron Blakeslee, Division of Purex Corporation, Santa Fe Springs, California. Typical chlorinated solvents include 1,1,1-Trichloroethane, perchlorethylene, and trichlorethylene.

Figure 4:
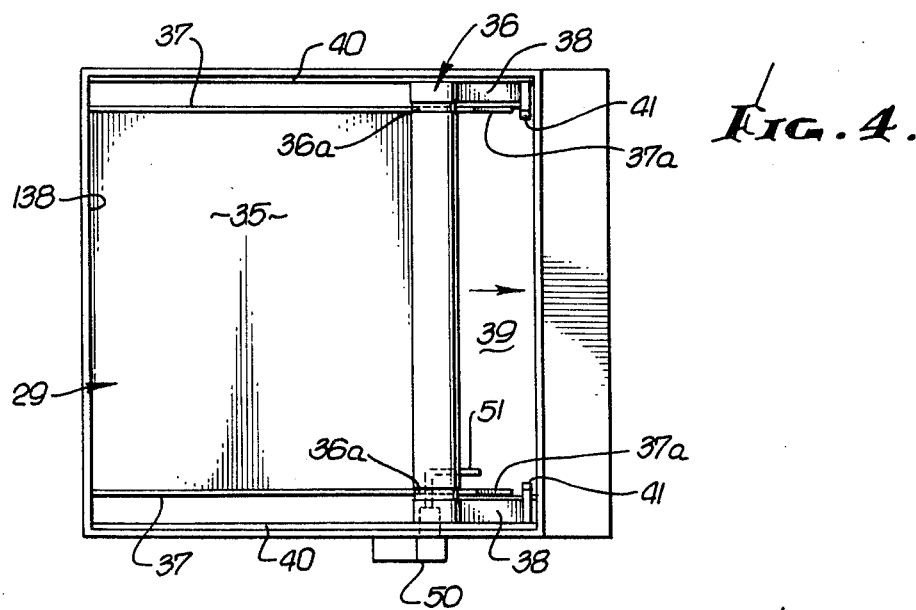
FIG. 4 is a reduced, top plan view of the tank.

Referring now to FIGS. 2, 3, and 4, the cover 29 may advantageously comprise a flexible sheet, as per example plastic sheet 35, wrapped on horizontally laterally elongated roller 36. The latter has end portions 36a rolling on horizontally longitudinally elongated rails 37. One end of the cover is attached to the tank as at 138, so that as the roller rolls to the right in FIGS. 2 and 4, the cover is unwrapped to extend over the tank interior 39. As the roller arrives at its terminally "closed" position, indicated by broken lines 36b in FIG. 2, it rolls down detent ramps 37a on the rails to be retained by gravity in that position, until opening of the cover is desired. At that time, the roller is rolled to the left in FIGS. 2 and 4, up the ramps and along the rails. A guide tape 38 may be rolled on each roller end portion, to be unrolled as the roller travels leftwardly in FIG. 4 to cover open position. A bracket 40 shown in FIG. 3 retains the rail 37 in position, as well as a tape clip 41, the latter retaining one end of the guidance tape near the end 42 of the tank. A similar bracket retains the opposite rail and tape.

In accordance with the invention, first means is provided to be responsive to closing of the cover to control the heater 12 in such manner as to decrease heat transfer to the liquid solvent at 11, and also to be responsive to opening of the cover to control the heater to increase heat transfer to the liquid solvent. Such first means typically may include an electrical switch, as at 50, having an actuating part, such as arm 51, in the path of movement of the cover roller to and from closed position. In FIG. 2, as the cover roller rolls down ramps 37a, it pushes arm 51 downwardly to the broken line position shown; and when the roller moves to the left, it releases the arm which rises to the alternate position indicated by solid lines 51a. FIGS. 5 and 6 also show the switch circuit to include a source of power 53, main switch 58, contacts 54 in branch 55, and a relay 57 to which power is supplied from a source 56. When the switch is closed by movement of the cover to or toward OPEN position (as indicated at 129), the auxiliary heater 12a is energized electrically to increase the heat transfer to the solvent, as represented in FIG. 5. A main heater 12b remains ON, to impart heat to the solvent whenever main switch 58 is closed, a relay 59 controlling power application to that heater.

Whereas FIG. 5 shows a full heat condition, with the cover 29 open, FIG. 6 shows a reduced heat condition with cover 29 closed at 129a, switch 50 open, and only heater 12b operating or energized. Inasmuch as heater 12a is not energized, power is saved. As pointed out, this enables substantial energy savings, especially during infrequent daily usuage of the degreaser apparatus which nevertheless must be ready for quick stand-by usage at any time.

A further aspect of the invention concerns the provision of second means responsive to the level of solvent in a holding zone for controlling the heater to increase the heat transfer to the liquid solvent in the collection zone 11 in response to decrease of the level to or below a predetermined level, and to decrease the heat transfer to the solvent in zone 11 in response to an increase of the level in the holding zone to or above a predetermined level. That holding zone may advantageously comprise the supply zone 26, so that if not enough solvent is collected in the latter (indicating that not enough solvent is being condensed) to keep the supply zone filled to be able to supply the spray pump 33, the heater 12a will be energized irrespective of the open or closed condition of the cover 29.

FIG. 1 shows the second means to comprise a level sensing device 60 located to sense the solvent level in the supply or holding zone 26; i.e. when the level 26a drops below the level of outlet 27 by a small predetermined amount (the device 60 typically being located adjacent the outlet 27) the device 60 effects energization of the heater 12a, (if it is not already energized) and when the level 26a closely approaches the level of outlet 27, the booster heater is de-energized by the device 60. The latter may comprise Model FG3AC-1, a produuct of Penn Controls, Division of Johnson Service Co.

FIG. 7 shows the device 60 in the form of a level sensing switch 60a in branch 61 of the circuit that includes source 53 and relay or contactor 57.

Finally, FIGS. 5-7 show a manually operable switch 63 in branch 64 between source 53 and relay 57. Accordingly, means is provided to be independently manually operable to control the heater 12a, as during start-up with the lid closed, or for re-distillation and clean up of the apparatus during periodic maintenance.

Figure 8:
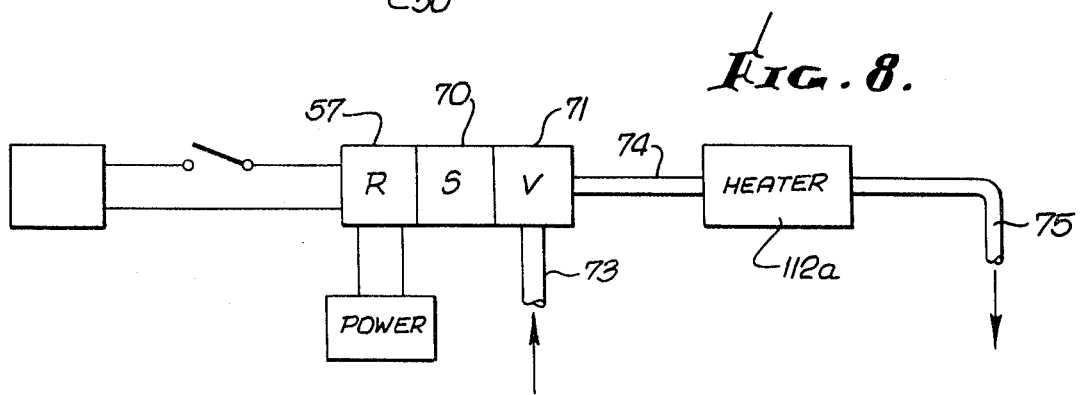
FIG. 8 is a showing of a heater control system.

Heater 12a may comprise an electrical heater as shown in FIGS. 5-7, or alternatively hot fluid heater (steam, gas, or liquid). FIG. 8 shows the relay 57 operating a solenoid 70 which controls a valve 71. The latter in turn controls flow of hot fluid via lines 73-75 to the heater indicated at 112a, and corresponding to heater 12a.

The cover for the tank may alternatively comprise a metal sheet, either hinged or flat, for manual lift up or lift off.

I claim:

1. In combination with work degreasing apparatus including a tank defining an interior sump zone for liquid solvent, and a heater located to transfer heat to the solvent to vaporize same for degreasing contact with work introduced into the tank, the vapor being subject to condensation, there also being a tank cover having open and closed positions, the improvement comprising:
   a. first means operatively connected with the heater and located to be responsive to closing of the cover to control the heater to reduce heat transfer to the liquid solvent, and also responsive to opening of the cover to control the heater to increase heat transfer to the liquid solvent.

2. The combination of claim 1 wherein said cover has a path of movement to and from closed position, and said first means comprises an electrical switch having a switch actuating part in said path of movement of the cover to and from closed position.

3. The combination of claim 2 wherein said cover includes a roller and a flexible sheet wrapped thereon and adapted to be unwrapped to extend over the tank interior in response to rolling of the roller over the tank interior, said switch part located proximate the roller extended position on the tank corresponding to closed position of the cover.

4. The combination of claim 3 including detent means on the tank releasably retaining the roller in said extended position.

5. The combination of claim 1 wherein said apparatus defines a solvent condensate holding zone from which the solvent is supplied to a collection zone for said liquid solvent to receive said heat transfer, said collection zone also defined by said apparatus, and second means responsive to the level of solvent in the holding zone for controlling the heater to increase heat transfer to the liquid solvent in the collection zone in response to decrease of said level to or below a predetermined level, and to decrease the heat transfer to the liquid solvent in the collection zone in response to increase of said level to or above a predetermined level, there being means to remove solvent from the holding zone and to spray the removed solvent onto work in the tank.

6. The combination of claim 5 wherein said holding zone has an outlet via which solvent condensate is supplied to the collection zone when the condensate in said holding zone rises to the level of said outlet, said second means comprising a solvent level sensing switch located to sense the solvent level in the holding zone.

7. The combination of claim 1 including independently manually operable means to control the heater to increase or decrease heat transfer to the liquid solvent.

8. The combination of claim 5 including independently manually operable means to control the heater to increase or decrease heat transfer to the liquid solvent in the collection zone.

9. The combination of claim 1 wherein the heater includes a first section controlled by said first means, and a second section which remains operable independent of the operation of said first means.

10. The combination of claim 5 wherein the heater includes a first section controlled by said first means and second means, and a second section which remains operable independent of the operation of said first and second means.

11. The combination of claim 1 wherein said heater comprises an electrical heater.

12. The combination of claim 1 wherein said heater comprises a conduit for heating fluid.

13. The combination of claim 5 wherein said heater comprises an electrical heater.

14. The combination of claim 5 wherein said heater comprises a conduit for heating fluid.

15. The combination of claim 5 wherein said means to spray the removed solvent onto work in the tank comprises a manually manipulable lance.

* * * * *